(12) United States Patent
Schneider

(10) Patent No.: US 6,491,513 B1
(45) Date of Patent: Dec. 10, 2002

(54) INTERNAL CORE LIFTER AND A MOLD INCORPORATING THE SAME

(75) Inventor: Douglas K. Schneider, Ellington, CT (US)

(73) Assignee: Omni Mold Systems, South Windsor, CT (US)

( * ) Notice: Subject to any disclaimer, the term of this patent is extended or adjusted under 35 U.S.C. 154(b) by 44 days.

(21) Appl. No.: 09/620,294

(22) Filed: Jul. 20, 2000

(51) Int. Cl.[7] .............................................. B29C 45/44
(52) U.S. Cl. ...................... 425/577; 425/556; 425/438; 425/DIG. 58
(58) Field of Search ...................... 425/DIG. 58, 556, 425/577, DIG. 10, 438; 264/334, 318

(56) References Cited

U.S. PATENT DOCUMENTS

| | | | |
|---|---|---|---|
| 1,349,122 A | 8/1920 | Edlund | 164/342 |
| 2,327,665 A | 8/1943 | Peat | 249/59 |
| 2,366,475 A | 1/1945 | Bartholomew | 249/59 |
| 3,843,088 A | 10/1974 | McLoughlin et al. | 249/144 |
| 3,930,777 A | 1/1976 | Ramsey | 425/190 |
| 4,938,679 A * | 7/1990 | Pietrorazio | 425/437 |
| 5,281,127 A | 1/1994 | Ramsey | 425/556 |
| 5,316,467 A | 5/1994 | Starkey | 425/438 |
| 5,368,467 A | 11/1994 | Kleyn | 425/556 |
| 5,403,179 A | 4/1995 | Ramsey | 425/577 |
| 5,456,593 A | 10/1995 | Kleyn | 425/556 |
| 5,551,864 A | 9/1996 | Boskovic | 425/556 |
| 5,773,048 A | 6/1998 | Ramsey | 425/556 |
| 5,814,357 A | 9/1998 | Boskovic | 425/556 |
| 6,039,558 A | 3/2000 | Park et al. | 425/556 |

* cited by examiner

Primary Examiner—Jan H. Silbaugh
Assistant Examiner—Joseph S Del Sole
(74) Attorney, Agent, or Firm—McCormick, Paulding & Huber LLP

(57) ABSTRACT

In an internal core lifter for molding and ejecting plastic parts, a core blade having a first and second end section is provided. The first end section is configured to cooperate with a mold used to produce the plastic parts and includes undercut forming portions to produce undercuts in a finished plastic part. At least one mounting member is coupled to the second end portion of the core blade and extends outwardly therefrom. A bracket mountable to a mold ejector plate slidably and pivotally receives the mounting member, thereby coupling the core blade to the bracket.

11 Claims, 3 Drawing Sheets

INTERNAL CORE LIFTER AND A MOLD INCORPORATING THE SAME

FIELD OF THE PRESENT INVENTION

The present invention is generally related to the injection molding of plastic parts and is more particularly directed to an internal core lifter for molding and ejecting plastic parts having an undercut and a mold incorporating the core lifter.

BACKGROUND OF THE PRESENT INVENTION

Core lifters are typically employed in plastic injection molds to aid in the formation of plastic parts having an undercut which could not normally be formed without employing a mold element that moves out of engagement with the plastic part when the mold is moved from a closed to an open position where the part is ejected. Most internal core lifters consist of a core blade inclined at a predetermined angle and having one end permanently mounted to, or integral with a coupling. Usually, the coupling is mounted to one half of the mold and can slide relative thereto. In known core lifters, the coupling and therefore the core blade is mounted to a support for sliding movement relative thereto when the mold is moved between the open and closed positions.

Historically, the core blade of a core lifter includes a first end that is incorporated into a mold cavity to mold and eject the plastic part. In order for the core blade to assist in the ejection of a plastic part without damaging the undercut therein, the core blade which is oriented at a specific molding angle, and the coupling are compelled to move along the support as the mold opens, to maintain the molding angle. As the core lifter moves, the first end moves away from the undercut, thereby allowing the plastic part to be ejected.

A difficulty associated with prior art core lifters is that each lifter was custom made for use with a particular mold, requiring an injection molding facility to maintain a large inventory of core lifters. In addition, since each core lifter was individually and custom manufactured, they tended to be expensive. Accordingly, there is a present need for an internal core lifter, wherein one lifter finds utility in a plurality of different injection molds.

Based on the foregoing, it is the general object of the present invention to provide an internal core lifter that overcomes the problems and drawbacks of prior art core lifters.

It is a more specific object of the present invention to provide an internal core lifter which with little modification, can be employed in a plurality of different injection molds.

SUMMARY OF THE PRESENT INVENTION

The present invention resides in an internal core lifter for molding and ejecting plastic parts. The internal core lifter includes a core blade defining a longitudinal axis and having a first end section and an opposing second end section, the first end section being configured to cooperate with a mold used to produce the plastic parts. Means for forming an undercut in the molded plastic part are also part of the first end section. In the preferred embodiment of the present invention, a mounting member is coupled to the second end section at least a portion of which projects outwardly from the core blade. A bracket fixedly mountable to a mold ejector plate includes means for slidably and pivotally receiving the mounting member thereby coupling the core blade to the bracket. The ejector plate is movable between a raised and a lowered position. Accordingly, upon completion of a molding operation, the mold is moved from the closed to the open position, and the ejector plate is moved from the lowered to the raised position. This motion of the ejector plate causes the core blade to move upward and away from the undercut, thereby ejecting the part.

Preferably, the means for forming an undercut in the molded plastic part includes a slot extending at least partway through the first end section of the core blade, approximately perpendicular to the core blade's longitudinal axis. During an injection molding operation, the slot is filled with plastic, which upon solidification forms the undercut in the plastic part. While a slot perpendicular to the core blade axis has been described, the present invention is not limited in this regard as other configurations such as inclined surfaces, or slots oriented at different angles can be employed without departing from the broader aspects of the present invention.

In the preferred embodiment of the present invention, the mounting member is in the form of a pin that extends transversely through the second end section of the core blade. Portions of the pin project outwardly from opposing sides of the core blade approximately perpendicular to the blade's longitudinal axis. In this embodiment of the present invention, the bracket has a first slot that extends from an upper surface of the bracket partway therethrough and is defined by a pair of opposed sidewalls. The bracket also includes a second and third slot, each in communication with the first slot and extending from a respective one of the pair of sidewalls approximately perpendicular to the first slot. When the internal core lifter is assembled in a mold, the above-described portions of the pin that project outwardly from the core blade are slidably and pivotally received within the second and third slots while a heel defined by the second end section of the core blade resides in the first slot.

A pair of support guides is also provided in this embodiment of the present invention, each defining an edge adapted to engage an outer surface of the core blade. When the internal core lifter is assembled in an injection mold, the core blade extends through an aperture defined by a part of the injection mold referred to by those skilled in the pertinent art to which the invention pertains as a "cavity block". Each support guide is coupled to the cavity block with the edges of the support guides extending into the aperture and engaging the core blade extending therethrough. Accordingly when the mold is moved from a closed to an open position, the ejector plate to which the above-described bracket is mounted can be moved from the lowered to the raised position so that the core blade slides relative to, and pivots about the edges of the support guides.

The present invention also resides in the mold for producing plastic parts that includes first and second mold halves adapted to move between an open and a closed position. Each mold half defines surfaces that cooperate with surfaces in the other mold half to form a shaped mold cavity. The mold includes an internal core lifter as described above with the core blade extending at least partway through each of said first and second mold halves. The bracket is mounted on an ejector plate forming part of one of the first and second mold halves and slidably and pivotally receives the mounting member coupled to the core blade. The ejector plate is movable between a lowered and raised position. Accordingly, when the first and second mold halves are moved between the closed and open positions, the ejector plate is moved from the lowered to the raised position, causing the mounting member, and thereby the core blade, to slide and pivot relative to the bracket.

Preferably, the ejector defines a recess having a shape complementary to a shape defined by the periphery of the bracket. When the mold is assembled, the bracket is positioned and secured within the recess, preventing any movement of the bracket relative to the ejector plate.

DETAILED DESCRIPTION OF THE PREFERRED EMBODIMENTS OF THE PRESENT INVENTION

Figure 1:
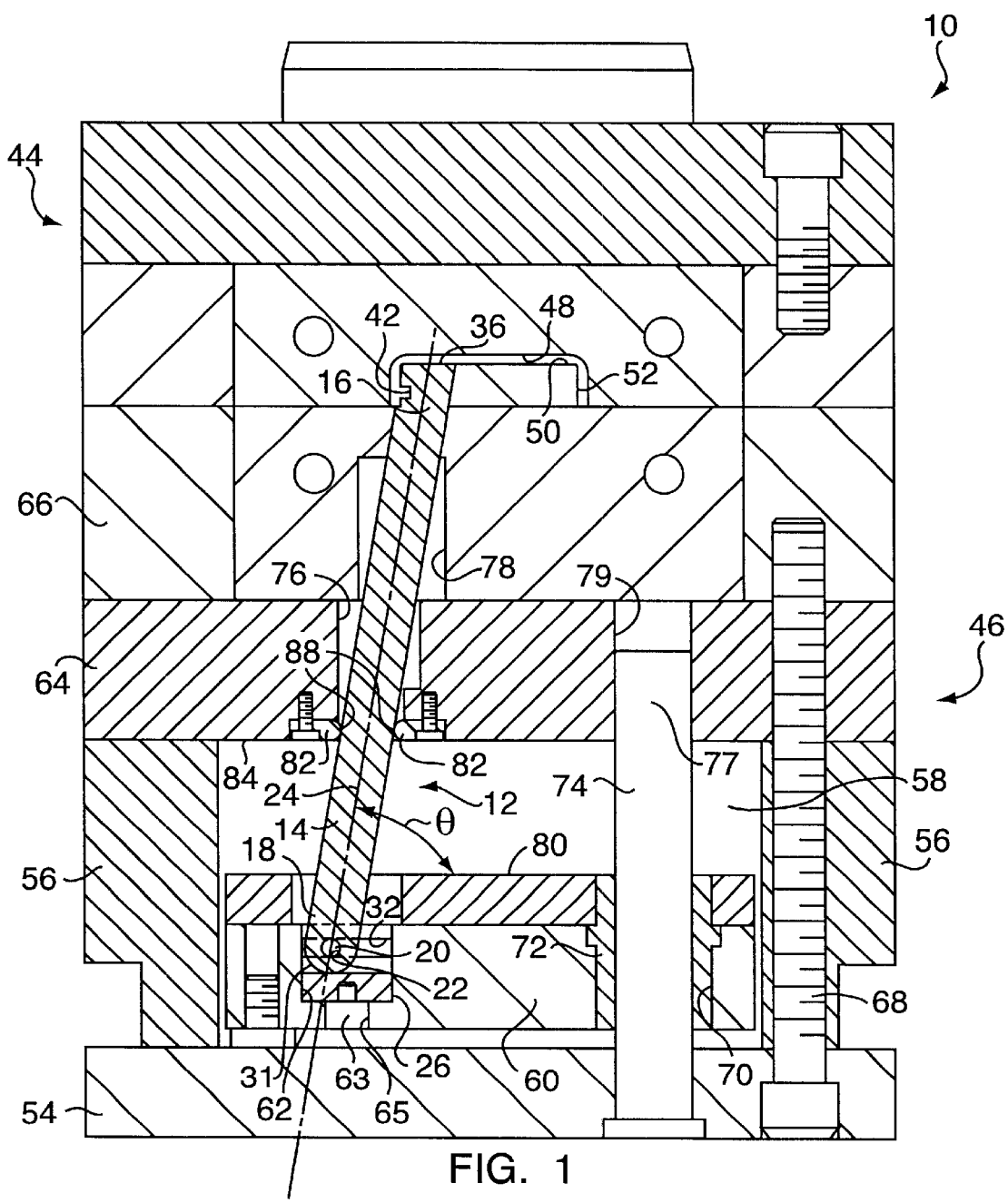
FIG. 1 is a front elevational, partially cross-sectional view of the mold incorporating the internal core lifter of the present invention and illustrating the mold in the closed position.

As shown in FIG. 1, a mold, generally designated by the reference number 10, is in a closed position and has an internal core lifter, generally designated by the reference number 12, mounted therein. The internal core lifter 12 is employed, inter alia, to form undercuts in molded plastic parts and includes a core blade generally designated by the number 14 and having generally opposed first and second end sections, 16 and 18 respectively. A mounting member, shown in the illustrated embodiment as a pin 20, extends through and is pressingly positioned in an aperture 22 defined by the lower end section 18 of the core blade 14. The pin 20 is approximately perpendicular to a longitudinal axis 24 defined by the core blade 14 and includes opposing end portions that extend outwardly from the core blade. While a pin 20 has been shown and described, the present invention is not limited in this regard as other mounting members, such as a pair of lugs attached to opposite sides of the core blade, can be substituted without departing from the broader aspects of the present invention.

Figure 2:
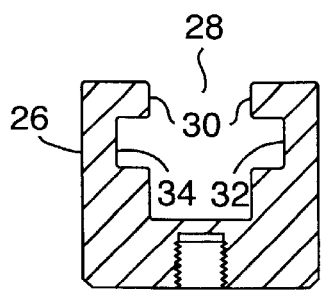
FIG. 2 is a front elevational view of a bracket for mounting the internal core lifter of FIG. 1 into the mold.

A bracket 26 is mounted, as explained in detail hereinbelow, to the mold 10 and includes a first slot 28 defined by opposing side walls 30 extending lengthwise along, and partly through the thickness of the bracket. The first slot 28 is adapted to slidably receive a heel 31 of the core blade 14 therein. Referring to FIG. 2, the bracket 26 also includes second and third slots, 32 and 34 respectively, each extending from one of the side walls 30. The second and third slots 32 and 34 are approximately perpendicular to the first slot 28 and are substantially aligned with one another such that when the heel 31 of the core blade 14 is positioned in the bracket 26 the portions of the pin 20 that extend outwardly from the core blade are slidably and pivotally located in the slots 32 and 34.

Figure 3:
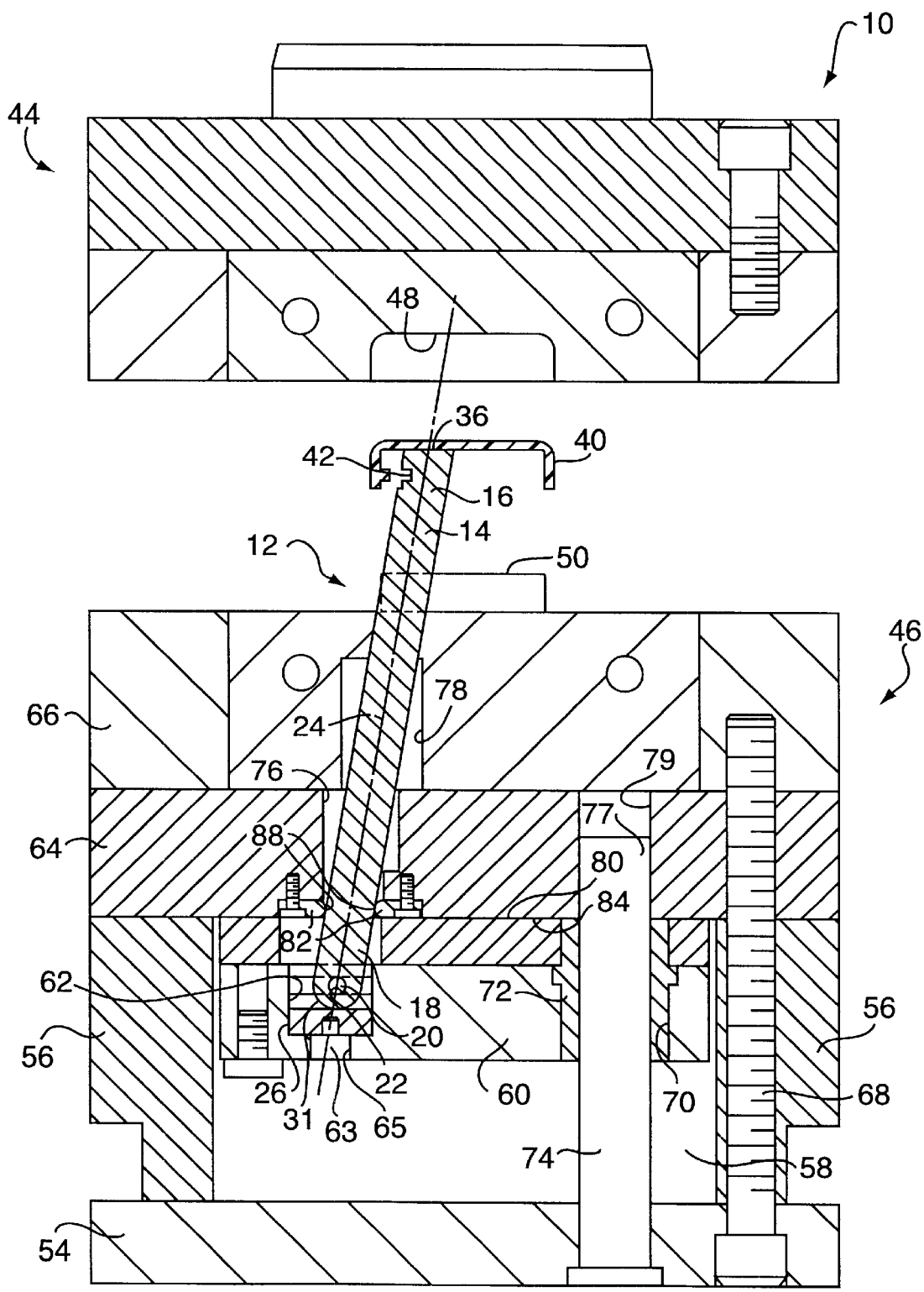
FIG. 3 is a front elevational, partially cross-sectional view of the mold incorporating the internal core lifter of the present invention and illustrating the mold in the open position.

Referring back to FIG. 1, as well as to FIG. 3 which illustrates the mold 10 in the open position, the first end section 16 of the core blade 14 includes an upper surface 36 that, when the internal core lifter 12 is positioned in the mold 10, forms a molding surface for a plastic part 40. While this surface is shown in the illustrated embodiment as being substantially flat, the present invention is not limited in this regard as any surface configuration necessary to the shape of the desired plastic part can be used without departing from the broader aspects of the present invention. In addition to the upper surface 36, the first end section 16 also includes means for forming an undercut in the plastic part 40, shown in the illustrated embodiment as a slot 42 extending across the core blade approximately perpendicular to the longitudinal axis 24. While a slot 42 has been shown and described, the present invention is not limited in this regard as other undercut forming configurations, such as an inclined surface or slots oriented at different angles, can be substituted without departing from the broader aspects of the present invention.

Still referring to FIGS. 1 and 3, the mold 10 includes a first mold half 44 and a second mold half 46, movable relative to each other between a closed position as illustrated in FIG. 1, and an open position as illustrated in FIG. 3. Each of the first and second mold halves, 44 and 46 respectively, define molding surfaces, 48 and 50 respectively, that together along with the upper surface 36 of the core blades 14 cooperate to form a shaped mold cavity 52, FIG. 1, when the mold 10 is in the closed position.

In the illustrated embodiment, the second mold half 46 includes a base plate 54. A pair of spacers 56 is supported in spaced relationship opposite one another on the base plate 54 defining a gap 58 between them. An ejector plate 60 is slidably located in the gap 58 and defines a recess 62 having a shape complementary to the shape defined by the periphery of the bracket 26. When the internal core lifter 12 is assembled in the mold 10, the bracket 26 is positioned in the recess 62 and secured in place by a fastener 63 that extends through an aperture 65 (FIG. 4) in the ejector plate and threadably engages the bracket. A support plate 64 is positioned on the spacers 56 opposite the base plate 54 and a cavity block 66 is positioned on top of the support plate.

The base plate 54, spacers 56, support plate 64 and cavity block 66 are all sandwiched together and held in place by a pair of elongated fasteners 68 (only one shown), each extending through the base plate, one of the spacers, and the support plate, and threadably engaging the cavity block. As shown in FIGS. 1 and 3, the ejector plate 60 includes a bore 70 extending therethrough, for receiving and retaining a bushing 72 therein. A pair of guide members 74 (one shown) extends through the base plate and is slidably received by the bushing 72. Each guide member includes an end portion 77 located in a first bore 79 defined by the support plate 64. During movement of the mold between the open and closed positions, the ejector plate can be slid along the guide members between a raised and a lowered position.

The support plate 64 and the cavity block 66 each define bores 76 and 78 respectively that communicate with, and are offset relative to one another. When the mold and internal core lifter, 10 and 12, are assembled, the core blade 14 extends through the bores 76 and 78 with the offset in the bores causing the core blade to be positioned at an angle θ relative to an upper surface 80 of the ejector plate 60 when the mold is in the closed position.

Still referring to FIGS. 1 and 3, a pair of support guides 82 are mounted to a surface 84 defined by the support plate 64 adjacent to the upper surface 80 of the ejector plate 60. Each of the support guides 82 includes an edge 88 that extends into the aperture 76 and engages opposite surfaces of the core blade 14. While a single internal core lifter has been shown and described, the present invention is not limited in this regard as any number of internal core lifters can be employed depending on the number of undercuts required by the particular part being molded.

Figure 4:
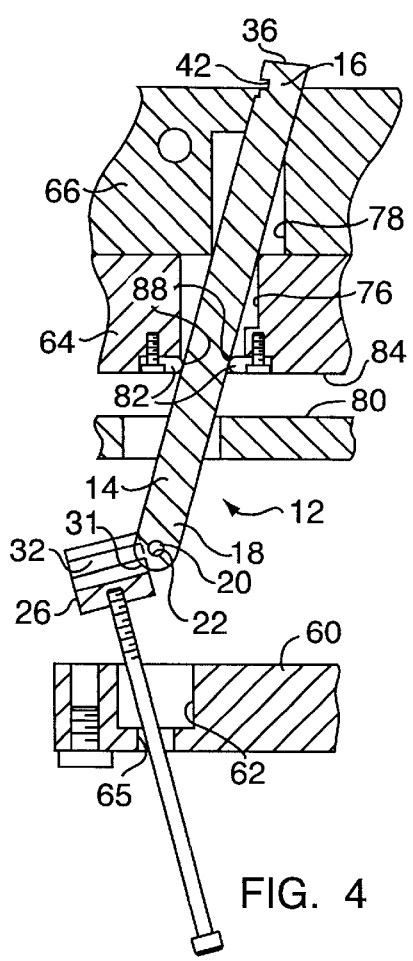
FIGS. 4 and 5 are partial, cross-sectional views of the mold of FIGS. 1 and 3, illustrating the manner by which the internal core lifter is assembled in the mold.
Figure 5:
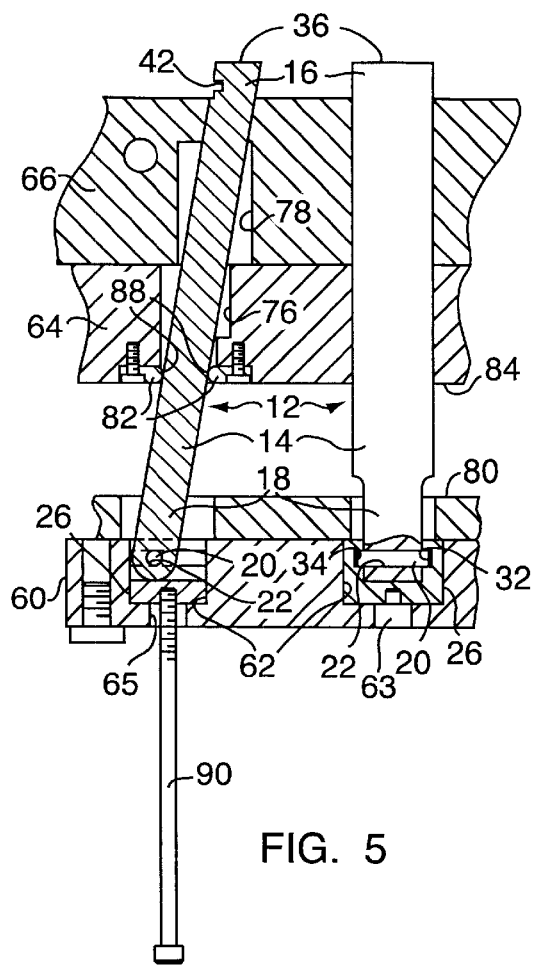

As shown in FIGS. 4 and 5, the internal core lifter 12 is assembled into a mold by inserting the core blade 14 between the support guides 82 and through the offset bores 76 and 78. Next, the threaded end of an elongated fastener 90 is inserted through the aperture 65 in the ejector plate 60 and is threadably engaged with the bracket 26. The second end section 18 of the core blade 14 and the pin 20 are then inserted into the slots 28, 32 and 34 of the bracket 26. The elongated fastener 90 is next used to pull the bracket 26 into the recess 62 defined by the ejector plate 60. The elongated fastener 90 is then unscrewed from the bracket 26, and the fastener 63, FIGS. 1 and 3, is then installed. While preferred embodiments have been shown and described, various modifications and substitutions may be made without departing from the spirit and scope of the present invention.

Figure 6:
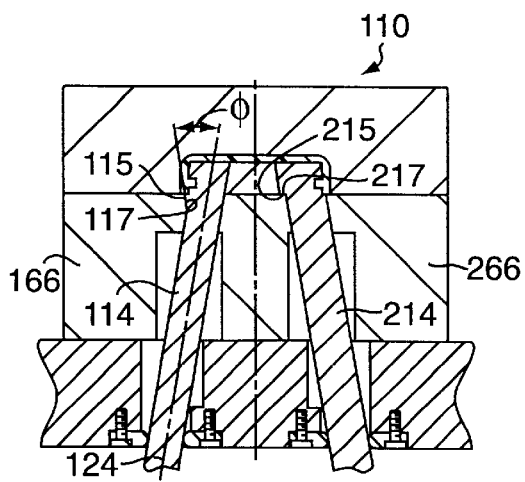
FIG. 6 illustrates two alternate embodiments of the core blade of the internal core lifter of the present invention.

For example, FIG. 6 illustrates two alternative configurations for the first end section of the core blade. The core blade on the left in FIG. 6 is generally designated by the reference numeral 114. The core blade 114 is similar in many respects to the core blade 14 described above, and therefore like reference numerals preceded by the number 1 are used to indicate like elements. The core blade 114 differs from the core blade 14 in that the first end section of the core blade defines a locking surface 115 projecting outwardly from the core blade and inclined at an angle φ relative to the longitudinal axis 124 defined by the core blade. When the core blade 114 is positioned in the mold 110, the locking surface 115 engages a receiving surface 117 defined by the cavity block 166 and having a shape complementary to the locking surface 115. Accordingly, when the mold 110 is in the closed position, the core blade 114 is securely held in place via the cooperation of the locking and receiving surfaces, 115 and 117 respectively.

The core blade on the right in FIG. 6 is generally designated by the reference numeral 214. The core blade 214 is similar in many respects to the core blade 14 described above, and therefore like reference numerals preceded by the number 2 are used to indicate like elements. The core blade 214 differs from the core blade 14 in that the first end section of the core blade defines a support shelf 215 extending outwardly from the core blade and adapted to engage an upper surface 217 of the cavity block 266. The support shelf securely retains the core blade in position during a molding operation.

Figure 7:
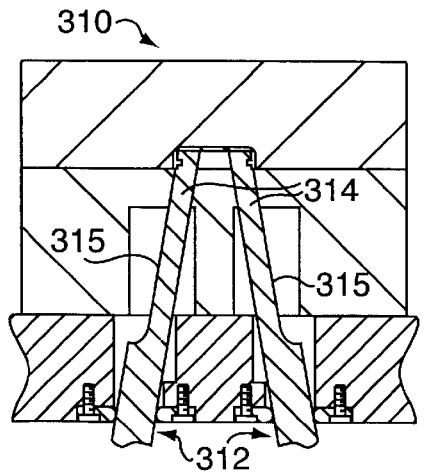
FIG. 7 illustrates an additional alternate embodiment of the core blade of the internal core lifter of the present invention.

Turning to FIG. 7, a pair of internal core lifters is generally designated by the reference number 312. The internal core lifters 312 are similar in many respects to the internal core lifter 12, and therefore like reference numerals preceded by the number 3 are used to indicate like elements. The internal core lifters 312 differ from the core lifter 12 in that the core blade 314 includes an area of diminished cross-section 315. This allows the core lifter to be used in connection with smaller molded plastic parts.

Referring back to FIGS. 1 and 3, when the mold is in the closed position as shown in FIG. 1, the internal core lifter 12 is positioned such that the core blade 14 is inclined at the angle θ and the upper surface 36, as well as the slot 42 act to define part of the shaped mold cavity 52. Once the plastic part 40 has been molded, the mold 10 is moved from the closed to the open position, as shown in FIG. 3, and the ejector plate 60 is moved from the lowered to the raised position. During movement of the ejector plate 60 from the lowered to the raised position, the core blade 14, due to the offset bores 76 and 78, slides on, and pivots about the mounting member 20, within the bracket 26. The sliding and pivoting motion of the core blade 14, as well as its movement from the lowered to the raised position, causes the upper blade section 16 to push against the plastic part 40 while at the same time the slot 42 disengages from the molded undercut. This has the effect of ejecting the plastic part from the mold.

While preferred embodiments have been shown and described, various modifications and substitutions may be made without departing from the spirit and scope of the present invention. Accordingly, it is to be understood that the present invention has been described by way of example, and not by limitation.

What is claimed is:

1. An internal core lifter for molding and ejecting plastic parts, comprising:

a core blade having a first and second end section, said first end section being configured to cooperate with a mold used to produce plastic parts and including means for forming an undercut in said plastic part;

at least one mounting member coupled to said second end section, at least a portion of which extends outwardly from said core blade; and a bracket fixedly mountable to a mold ejector plate and including means for slidably and pivotally receiving said mounting member, thereby coupling said core blade to said bracket.

2. An internal core lifter as claimed in claim 1 wherein said means for forming an undercut includes a slot extending at least partway through said first end section of said core blade, said slot being approximately perpendicular to a longitudinal axis defined by said core blade.

3. An internal core lifter as claimed in claim 1, wherein said at least one mounting member is a pin that extends transversely through said second end section, said pin having portions that project outwardly from opposing sides of said core blade.

4. An internal core lifter as claimed in claim 3, wherein:

said second end section defines a heel portion;

said bracket having a first slot defined in part by a pair of opposing side walls, said first slot extending at least partway through said bracket and adapted to slidably receive said heel portion, a second and third slot each in communication with said first slot and extending from a respective one of said pair of side walls approximately perpendicular to said first slot; and wherein each of said second and third slots is adapted to slidably and pivotally receive one of said portions of said pin.

5. An internal core lifter as claimed in claim 1, further comprising:

a pair of support guides, each adapted to be mounted to a support plate adjacent to opposing sides of an aperture extending therethrough;

each support guide having an edge that extends partway into said support plate aperture; and wherein said core blade, when said internal core lifter is assembled in a mold, extends through said aperture in said support plate and engages said support guides, so that when said mold is moved between a closed and open position, said core blade slides relative to, and pivots about said edges defined by said pair of support guides.

6. An internal core lifter as claimed in claim 1, wherein:

said first end section of said core blade defines a locking surface projecting outwardly from said core blade and inclined at an angle relative to a longitudinal axis defined by said core blade; and wherein said locking surface is adjacent to said means for forming an undercut and is adapted to engage a receiving surface defined by said mold, thereby fixing the position of said core blade when said mold is in said closed position.

7. An internal core lifter as claimed in claim 1, wherein:

said first end section of said core blade includes an outwardly projecting support shelf opposite to said means for forming an undercut, said support shelf defining a support surface engageable with a surface of said mold, thereby fixing the position of said core blade when the mold is in the closed position.

8. A mold for producing plastic parts comprising:

a first and second mold half, each defining interior surfaces that together cooperate to define a shaped mold cavity;

said first and second mold halves being movable relative to each other between a closed position wherein a plastic part can be molded, and an open position wherein said first and second mold halves are spaced relative to each other so that the plastic part can be ejected;

an internal core lifter positioned within the mold and including:

a core blade extending at least partway through said first and second mold halves and having a first end portion configured by an end user to cooperate with a mold to produce a plastic part having an undercut, and a second end portion having at least one mounting member coupled thereto, at least a portion of which extends outwardly therefrom, said mounting member being approximately perpendicular to a longitudinal axis defined by said core blade; and a bracket fixedly mounted on one of said first and second mold halves, said bracket including means for slidably and pivotally receiving said mounting member, so that when said first and second mold halves move between said closed and open positions, said mounting member and thereby said core blade slides on and pivots about said bracket.

9. A mold as claimed in claim 8, wherein said first mold half includes:

a cavity block defining said interior surfaces, and an aperture extending therethrough, and through which said core blade extends;

a support plate positioned adjacent said cavity block and having a surface adapted to engage said cavity block;

said support plate having an aperture through which said core blade extends, said support plate aperture being offset from said cavity block aperture; and an ejector plate adjacent said support plate, said ejector plate being movable between a raised position and a lowered position.

10. A mold as claimed in claim 9 wherein said internal core lifter further comprises a pair of support guides, each defining an edge extending into said support plate aperture and adapted to engage said core blade so that upon movement of said ejector plate between said lowered and raised positions, said core blade slides relative to, and pivots about said support guides.

11. A mold as claimed in claim 9 wherein said bracket defines a peripheral shape, and said ejector plate includes a recess having a shape complementary to said peripheral shape of said bracket, said bracket being secured in said recess via a fastener.

\* \* \* \* \*